Feb. 24, 1970     R. R. GRABER     3,496,772
PISTON FOR FLUID METER
Filed Aug. 30, 1967

INVENTOR.
RALPH R. GRABER
PENDLETON, NEUMAN
SEIBOLD & WILLIAMS

United States Patent Office 3,496,772
Patented Feb. 24, 1970

3,496,772
PISTON FOR FLUID METER
Ralph R. Graber, Milwaukee, Wis., assignor to Badger Meter Manufacturing Company, Milwaukee, Wis., a corporation of Wisconsin
Filed Aug. 30, 1967, Ser. No. 664,441
Int. Cl. G01f 3/08
U.S. Cl. 73—253                               6 Claims

ABSTRACT OF THE DISCLOSURE

A piston for an oscillating piston meter having a grid of integral raised bearing surfaces on its end wall.

BACKGROUND OF THE INVENTION

Field of the invention

This invention relates to pistons for oscillating piston meters, and particularly to so-called U-section or cup-shaped pistons, referred to hereinafter as cup-shaped pistons.

Description of the prior art

One problem area in oscillating piston meters utilizing cup-shaped pistons is that of friction between the end wall of the piston and the adjacent end wall of the measuring chamber. The fluid pressure within the piston tends to thrust the piston against the end of the measuring chamber housing during operation of the meter, thereby causing wear of the end wall of the piston and/or of the end wall of the chamber. The resulting drag on the piston also represents power consumption in the operation of the meter which causes a loss of head across the meter and thereby reduces the accuracy and efficiency of the meter.

Openings previous have been provided through the end wall of a cup-shaped oscillating piston to attempt to equalize the pressure inside and outside the piston, see e.g. Lindley et al. United States Patent No. 2,566,220 issued Aug. 28, 1951. However, it is necessary to maintain sealing contact of the piston with the end wall of the measuring chamber between these openings to prevent leakage between the metering compartments. Due to this required sealing contact, friction between the piston end wall and the end wall of the measuring chamber, and the resultant drag on the piston have remained as problems.

The objects of this invention include reducing the drag on the piston and reducing the wear on the piston and the measuring chamber walls, while maintaining an effective sealing relation between the end wall of the piston and the end wall of the measuring chamber in oscillating piston meters. Further and additional objects and advantages will appear from the description, the accompanying drawings and the appended claims.

Summary of the invention

A cup-shaped piston for an oscillating piston fluid meter is provided with raised bearing portions on the outer surface of its end wall for sliding engagement with an end surface of a metering chamber.

For a more complete understanding of this invention reference should be had to the embodiment illustrated in the accompanying drawing and described below by way of an example of the invention.

Description

Figure 2:
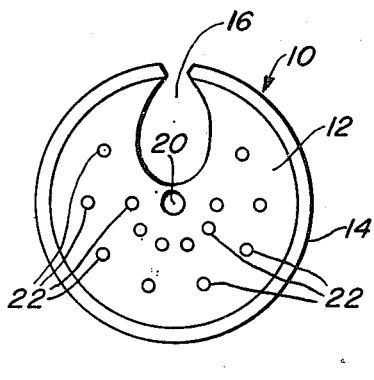
FIG. 2 is an opposite end view of the piston of FIG. 1.
Figure 1:
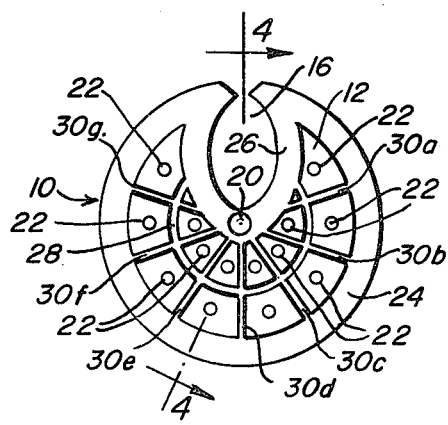
FIG. 1 is an end view of a piston employing teachings of this invention.
Figure 3:
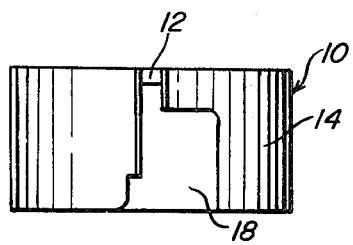
FIG. 3 is a side elevation view of the piston of FIG. 1.
Figure 4:
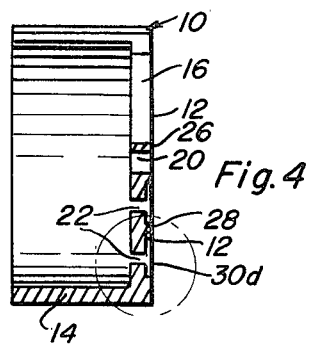
FIG. 4 is a cross-sectional view taken along line 4—4 of FIG. 1 and looking in the direction of the arrows.
Figure 5:
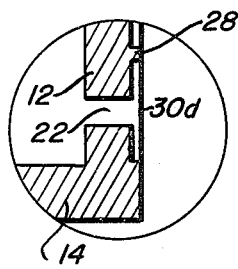
FIG. 5 is an enlarged view of a segment of FIG. 4 as indicated.

Referring to the drawing, the illustrated piston 10 includes an end wall 12, and an integral skirt or side wall 14 of a hollow right circular cylindrical configuration. The end wall is formed with a tear-drop opening 16 and the side wall is formed with an opening 18, both of which may be of forms known in conventional pistons of this type. An opening 20 is provided in the center of wall 12 for engagement with a guide and/or output drive element in a meter assembly in a known manner, and openings 22 are provided through the wall for equalizing the pressure inside and outside the piston when in use in a measuring device.

The end wall 12 is formed with a raised marginal portion 24 extending around the periphery of end wall 12, and with a similar raised marginal portion 26 extending around the periphery of opening 16. A narrower, circular raised portion or rib 28 is provided midway between the center and the periphery of the wall 12, and similar raised portions or ribs 30b–30f extend radially outward from the center of wall 12 to marginal portion 24. Two similar radial ribs 30a and 30 g extend from marginal portion 26 to portion 24. The several raised portions form a grid pattern corresponding generally to a radial or polar grid having its center at opening 20. Openings 22 are disposed between the ribs of the grid, with one opening in each grid section, as illustrated. The diameter of each hole 22 is less than the thickness of the subjacent side wall of the hub (not shown) on and about which the piston oscillates, to prevent leakage between the metering compartments through the various openings 22.

Each of the illustrated raised portions is integral with wall 12, and these portions may be conveniently and economically formed in the molding of the piston. The outer surfaces of the various raised portions lie in the same plane for simultaneous engagement with the planar inner surface of the end wall of an oscillating piston metering chamber in which the piston is operated.

By way of a specific example, pistons of the construction illustrated herein were molded as integral units, utilizing a chlorinated polyether thermoplastic polymer (Penton, sold by Hercules Powder Co.) with a graphite Wollastonite filler. The subject pistons were 2.018" O.D. and 1.805" I.D., having an end wall 12 of 0.128" thickness in the areas between the raised portions. The raised portions extended 0.007" (±0.005") outward from the outer surface of wall 12 therebetween. Marginal portion 26 was 3/16" wide and portion 24 was of the same or somewhat less width. Each of the ribs 28 and 30a–30g was 0.003" wide, and ribs 30a–30g were arranged on centerlines at 36° intervals. The aggregate area of the raised portions was about 50% of the area of the outer surface of wall 12. Such pistons have provided highly satisfactory service in stainless steel measuring chamber housings in oscillating piston water meters and have provided a substantial reduction in drag or friction loss over a similar meter with a flat end surface.

It will thus been seen that an improved piston design has been provided which will substantially reduce the bearing area and consequently the area of sliding frictional contact between the piston and a measuring chamber wall. This design will reduce the total friction or drag between these parts to provide more accurate and efficient operation of the meters, and will reduce the wear on the piston and measuring chamber walls. Further, these improved pistons may be economically produced.

While a particular embodiment of this invention has been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements, within the true spirit and scope of the invention.

I claim:

1. A cup-shaped piston adapted for use in an oscillating piston fluid meter and including an end wall and a skirt portion extending therefrom, said end wall having raised bearing portions on its outer surface for sliding engagement with an end surface of a metering chamber.

2. A cup-shaped piston as in claim 1 wherein said raised portions are formed integral with said end wall.

3. A cup-shaped piston as in claim 1 wherein said raised portions include a border portion extending along the periphery of the outer surface of said end wall.

4. A cup-shaped piston as in claim 1 wherein said raised portions define a grid on the outer surface of said end wall.

5. A cup-shaped piston as in claim 4 wherein said end wall is formed with openings therethrough between the raised portions defining said grid.

6. A cup-shaped piston as in claim 1 wherein said raised areas comprise about 50% of the area of the outer surface of said end wall.

References Cited

UNITED STATES PATENTS 1,856,850   5/1932   Marden _____ 73—257

FOREIGN PATENTS 968,398   2/1958   Germany.
661,809   11/1951   Great Britain.

RICHARD C. QUEISSER, Primary Examiner

JOHN K. LUNSFORD, Assistant Examiner

PO-1050
(5/69)

UNITED STATES PATENT OFFICE
CERTIFICATE OF CORRECTION

Patent No. 3,496,772          Dated February 24, 1970

Inventor(s) Ralph R. Graber

It is certified that error appears in the above-identified patent and that said Letters Patent are hereby corrected as shown below:

Column 1, line 36, "previous" should read -- previously --. Column 2, line 55, "0.003" should read -- 0.030 --; line 63, "been" should read -- be --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents